United States Patent Office 3,027,234
Patented Mar. 27, 1962

3,027,234
MANUFACTURE OF SPHEROIDAL ALUMINA
PARTICLES FROM ALUMINUM SULFATE
Edward Michalko, Chicago, Ill., assignor to Universal Oil Products Company, Des Plaines, Ill., a corporation of Delaware
No Drawing. Filed Sept. 8, 1959, Ser. No. 838,420
3 Claims. (Cl. 23—143)

The present invention relates, in its most broad scope, to a process for manufacturing spherical alumina particles, and is more particularly directed to a novel method for manufacturing spherical alumina particles utilizing aluminum sulfate as the source of a substantial quantity of the aluminum which is transformed ultimately into alumina. More specifically, the method of the present invention involves a combination of manufacturing procedures designed to permit the use of aluminum sulfate, which has not heretofore been possible, in producing homogeneous, spherical alumina particles, especially through the utilization of the well-known oil-drop method.

Alumina, in its many forms, as aluminum oxide hydrate, or aluminum hydroxide, is used extensively in the chemical and petroleum industries. Alumina is employed as a catalyst in and of itself, and often serves as a carrier material for other catalytically active metallic and non-metallic components. In addition, as a result of its inherently high degree of porosity, alumina is often utilized as a dehydrating, treating or purifying agent. For many uses, alumina is combined with other refractory inorganic oxides such as silica, magnesia, thoria, titania, boron oxide, zirconia, etc. and mixtures of the same, the particular combination generally being dependent upon the use for which the refractory material is intended.

One of the first commercial methods for the manufacture of alumina, consisted of recovering aluminum oxide from various naturally-occurring clays, ores and earths. A long, arduous process was involved, which process produced a comparatively low-grade, relatively expensive alumina. Many investigations have since been conducted, in regard to manufacturing processes, whereby a relatively inexpensive, high-purity alumina might be produced. Precipitation methods have been studied in which a weak alkaline material, such as an aqueous solution of ammonium hydroxide, is added to an aqueous solution of an aluminum salt to form a precipitate of alumina. However, due to certain physical characteristics imparted to the resulting alumina, inherently resulting from the use of ammonium hydroxide, the precipitate thus formed in difficult to convert into an alumina which is suitable for serving any of the functions previously described. As a consequence, other, more expensive alkaline materials must be employed as precipitants, and the precipitation methods thereby become difficult to justify economically. In addition, even though the alkaline precipitant may be suitable, not all of the salts of aluminum are advantageously employed. For example, when aluminum sulfate, which is readily obtainable at low cost, is used, the resulting precipitate is notoriously difficult to process to its final form. Washing to remove various contaminants is extremely tedious, and, although washing by filtration is employed, relatively long periods of time are required to produce an acceptable filter cake, of sufficiently high solids content, which can be dried easily, and formed into the desired shape, and/or further treated for use as a carrier material for catalysts. It is extremely difficult to obtain a filter cake possessing a solids content in excess of about 10% by weight, and although some cakes have shown a solids content as high as 12%, such instances are rare. The difficulties encountered while attempting to produce an acceptable alumina particle from aluminum sulfate, are greatly magnified where it is desired to produce homogeneous spherical alumina particles, by such means as the well-known oil-drop method.

The use of alumina particles in substantially spherical or spheroidal shape offers numerous advantages over other shapes, and particularly when the alumina is employed as an adsorbent, treating, refining, or purifying agent, or as a catalyst or component of a catalyst for the conversion of organic compounds and for the reforming of hydrocarbons. When employed as a fixed bed of catalyst in a reaction or contacting zone, the spherical-shaped particles permit a more uniform packing, thereby reducing variations in the pressure drop through the fixed bed, and in turn reducing channeling which results in a portion of the bed being by-passed. Another advantage to the utilization of spheroidal shaped alumina particles is that such alumina particles contain no sharp edges to wear or break off during processing or handling and, therefore, the tendency to plug process equipment is reduced. These particular advantages are enhanced when the alumina particles are employed in a moving bed; that is, when the particles are transported from one section of the process to another by either the reactants, or by an extraneous carrying medium.

Recently, spherical alumina particles of uniform size and shape, and possessing uniformity of physical characteristics, have been obtained by a procedure which involves dispersing an alumina hydrosol, in the form of droplets, into a suitable gelling medium, and immediately thereafter subjecting the resulting alumina hydrogel spheroids to specific aging treatments for the purpose of imparting thereto certain desired physical characteristics. A complete aging treatment generally consists of aging in hot oil for a period of at least about 10 hours, aging in a suitable liquid alkaline medium for at least about 10 hours, and finally, washing with water to reduce the concentration of alkaline medium. This procedure is known as the "oil-drop" method of sphere formation, and is thoroughly described in U.S. Patent No. 2,620,314, issued to James Hoekstra. Extensive investigations have been conducted in regard to this method of manufacturing spherical alumina particles, and have indicated that alumina particles are not as readily manufactured by this method as are other inorganic oxide particles, such as, for example, silica spheres. In order to obtain acceptable spherical particles of alumina, it is necessary to employ a sol which will not set to a gel until after some time interval has elapsed. It has been found that spherical alumina particles may be manufactured by the oil-drop method provided certain processing considerations are observed. Spherical alumina particles may be manufactured by a method which comprises commingling an alumina hydrosol with hexamethylenetetramine, a weak base having a strong buffering action at a pH of from about 4 to about 10, and an increased rate of hydrolysis at an increased temperature without the evolution of gas; the resultant mixture is passed in the form of droplets into an oil bath maintained at elevated temperature. The droplets of alumina hydrosol are retained in the hot oil until the sol sets into firm alumina hydrogel spheroids. The use of hexamethylenetetramine produces alumina hydrogel spheroids which are uniform in size and shape, and which possess uniformity of physical characteristics. Following the aging treatment hereinbefore described, the spheroids are subjected to drying and calcining treatments, and may then be employed as catalyst carrier material, etc.

A variety of methods are currently employed to prepare the alumina hydrosol for use in the above described oil-drop method of sphere formation. Perhaps the most common is that which consists essentially of digesting an excessive quantity of substantially pure metallic aluminum with an aqueous solution of hydrogen chloride, subsequently adjusting the resulting hydrosol to obtain the proper quantity of aluminum necessary to attain acceptable sphere formation. In another method, a solution of aluminum chloride is electrolyzed within an electrolytic cell having a porous partition between the anode and cathode. An alumina hydrosol may also be prepared by a digestion procedure similar to that hereinabove described: in this method, pure metallic aluminum is added to an aqueous solution of aluminum chloride, and the resulting mixture is subjected to digestion at its boiling point for an extended period of time. These methods have several aspects in common: all employ either aluminum chloride, or substantially pure metallic aluminum, or a combination of these, for the purpose of producing an aluminum chloride hydrosol; none of the methods utilizes aluminum sulfate, it having been though impractical, if not impossible, to effect the formation of firm alumina hydrogel spheroids therefrom.

The object of the present invention is to provide an economical method for producing spherical alumina particles of uniform size and shape, and which particles are produced by the utilization of a process which avoids arduous, expensive procedures while permitting the use of aluminum sulfate as the source of at least about 50% by weight of the aluminum which is converted ultimately into alumina. The method of the present invention utilizes a combination of processing procedures including precipitation at a constantly acidic pH level, and within a limited range thereof; re-slurrying of the precipitated basic aluminum sulfate, employing urea therefor; commingling of the precipitate with an aluminum chloride hydrosol; and, the use of hexamethylenetetramine in admixture with the alumina hydrosol from which alumina spheres are produced according to the well-known oildrop method. Through the utilization of one of the more specific embodiments, the method of the present invention affords simplified means of controlling the apparent bulk density of the final spherical alumina particles. It is possible to produce an extremely hard alumina particle of very high apparent bulk density, or, conversley, an alumina particle having an apparent bulk density sufficiently low to permit its economical use, without lowering the peripheral crushing strength to a degree which prohibits the widespread utilization of the particles.

In its most broad embodiment, the present invention relates to a method for utilizing aluminum sulfate, as the source of aluminum, in the manufacture of spherical alumina particles, which method comprises simultaneously commingling an aqueous solution of aluminum sulfate with an aqueous solution of ammonium hydroxide at a constantly acidic pH level within the range of about 5.5 to about 6.5, thereby precipitating insoluble basic aluminum sulfate, re-slurrying the basic aluminum sulfate with an aqueous solution of urea, and an aluminum chloride hydrosol, adding hexamethylenetetramine thereto and passing the resulting mixture into an oil bath in the form of droplets, retaining the droplets in said oil until they set to hydrogel spheroids, and thereafter drying and calcining said hydrogel spheroids, obtaining firm, spherical alumina particles.

In a more specific embodiment, the present invention provides a method for the manufacture of spherical alumina particles from aluminum sulfate, which comprises preparing basic aluminum sulfate via the simultaneous commingling of an aqueous solution of aluminum sulfate with an aqueous solution of ammonium hydroxide at a constantly acidic pH within the range of about 5.5 to about 6.5, thereby precipitating basic aluminum sulfate, commingling said basic aluminum sulfate at a temperature below about 120° F. with an aluminum chloride hydrosol having an aluminum to chloride weight ratio not substantially in excess of 1.25 to yield a weight ratio of the alumina equivalent of said basic aluminum sulfate to the alumina equivalent of said aluminum chloride hydrosol of at least about 1:1 to about 3:2, heating the resulting mixture at a temperature above 120° F. until the basic aluminum sulfate is dissolved, decreasing the temperature of the resulting clear solution to below 120° F., adding urea thereto, thereafter adding hexamethylenetetramine and passing the resultant mixture into an oil bath in the form of droplets, retaining the droplets in said oil until they set to hydrogel spheroids, and thereafter drying and calcining said hydrogel spheroids, obtaining firm spherical alumina particles.

In another specific embodiment, the present invention affords advantages to the process of manufacturing spherical alumina particles from aluminum sulfate by a method which comprises simultaneously commingling an aqueous solution of aluminum sulfate with an aqueous solution of ammonium hydroxide, maintaining the pH of the resulting mixture at a constantly acidic level within the range of about 5.5 to about 6.5, thereby forming insoluble basic aluminum sulfate, liquefying said basic aluminum sulfate with an aqueous solution of urea at a temperature below about 120° F. and in an amount to yield a weight ratio of the alumina equivalent of the basic aluminum sulfate to urea not substantially in excess of 3.5:1, commingling the resulting solution, while at a temperature below about 120° F., with an aluminum chloride hydrosol having an aluminum to chloride weight ratio within the range of about 0.95 to about 1.25 and in an amount to yield a weight ratio of the alumina equivalent of said basic aluminum sulfate to the alumina equivalent of said aluminum chloride hydrosol within the range of about 1:1 to about 3:2, adding hexamethylenetetramine to the resultant mixture and passing it into an oil bath in the form of droplets, retaining the droplets in said oil until they set to hydrogel spheroids, thereafter drying and calcining said hydrogel spheroids and recovering firm spherical alumina particles.

Aluminum sulfate is one of the more abundant compounds of aluminum, and, therefore, the present invention has the distinct economical advantage afforded through its use, as opposed, for example, to the use of pure metallic aluminum. The aluminum sulfate employed in the method of the present invention may be obtained from any suitable source, and may be naturally-occurring, or synthetically prepared. At the present time, a large source of aluminum sulfate is available as a by-product from many of the processes designed to remove and recover catalytically active metallic components from used catalysts employing alumina as the carrier material. The processes, in general, employ sulfuric acid for the purpose of dissolving the alumina, leaving the metallic components in a finely divided state, and producing thereby an aluminum sulfate by-product. It is not intended, however, to limit the present invention to any particular source of aluminum sulfate.

The first step in the combination of procedures, which I employ to produce spherical alumina from aluminum sulfate by the oil-drop method, consists of reducing the sulfate ion concentration of the aluminum sulfate solution through the precipitation of insoluble basic aluminum sulfate therefrom. This precipitation is effected at a constantly acidic pH level, and within the range of about 5.5 to about 6.5. Conventional methods for precipitating alumina involve the procedure of adding a solution of one compound to a vessel containing a large supply of the other compound. In this manner, for example, a solution of ammonium hydroxide is added to a vessel which contains a large amount of an aqueous solution of an aluminum salt thereby precipitating alumina. However, the pH during this precipitation method either starts at a low level and increases, or starts at a high level and slowly decreases. The alumina so produced has an extremely low solids content and is very difficult to wash because of its inherently poor filtration characteristics. When the pH of the mixture is maintained at a constantly acidic level, throughout the period of mixing, as well as during the ensuing formation of aluminum hydroxide and precipitation of alumina, a dense, granular precipitate is obtained which has a relatively high solids content, is readily filtered because of the more granular character of the alumina precipitate, and may also be readily washed for the removal of various contaminants. Although the resulting alumina precipitate may be washed by any well-known and suitable procedure, a particularly preferred method comprises filtering the precipitate from its aqueous suspension and continuing the suction on the underside of the filter cake as the washing solution is added to the top of the filter cake. This method tends to decrease the quantity of alumina which is inherently lost and subsequently unrecoverable through the use of other methods. In addition, filtering produces the alumina in a form which is easily handled and which is readily adaptable for further processing.

It is preferred to employ aqueous solutions of the ammonium hydroxide and aluminum sulfate to precipitate the insoluble basic aluminum sulfate, and any suitable concentrations may be used. For ease in handling, metering, and applying the method of the present invention, aqueous solutions of from about 15% to about 40% by weight are preferred, although other concentrations may be advantageously used. The solutions are simultaneously added to any suitable vessel containing a mechanism for mixing and which is equipped with any suitable means for determining the pH of the resulting mixture, and controlling the pH by adjusting the rates of addition of either and/or both the solutions of ammonium hydroxide and aluminum sulfate. A sufficiently small amount of aluminum sulfate is added to a small amount of water to bring the initial contents of the vessel to the desired pH level of about 6.0. The solutions of ammonium hydroxide and aluminum sulfate are then simultaneously added, and the rates of either or both continuously adjusted to maintain the pH of the mixture at the level of the initial contents of the vessel. When the desired quantity of basic aluminum sulfate has been precipitated, the addition of both the ammonium hydroxide and the aluminum sulfate is stopped.

The basic aluminum sulfate, prepared by the constantly acidic pH precipitation, is recovered as a finely divided slurry or semi-colloidal suspension. As such, it is not suitable for use as charge to the sphere dropping tower, in which the setting oil is contained, due to the virtually complete incapability of assuming a spherical shape upon passing through the dropping tips. Instead, there results an irregularly shaped mass insufficiently gelled to permit the acceptable use thereof. The basic aluminum sulfate must be further treated to obtain an alumina hydrosol which not only is capable of assuming a spherical shape in the dropping tower, but which will also result in spheres exhibiting uniforming of composition and physical characteristics.

In accordance with the present invention, the final aluminum-containing hydrosol, designated to be the charge material to the forming tower, may be prepared by two different procedures, each of which involves the identical individual steps in slightly different sequence. Through the utilization of either procedure, the apparent bulk density of the final spherical particles is readily subject to control within the range of about 0.50 to about 0.80 grams per cubic centimeter. Following the first procedure, denoted herein as the "slurry" method, alumina particles are produced possessing an unusually high peripheral crushing strength, and having an apparent bulk density in excess of 0.70, and as high as 0.80. The second procedure, referred to herein as the "digestive" method, produces spherical alumina particles of generally lower apparent bulk density, from about 0.45 to about 0.75, without experiencing severe loss in peripheral crushing strength.

For several reasons, the "digestive" method is preferred; this particular procedure results in spherical particles of greater uniformity of physical and chemical characteristics, and is more homogeneous than the spheres produced by the "slurry" method. In addition, the apparent bulk density of the final product is more easily controlled, and is of a degree which permits a more economical use as carrier material in the manufacture of catalytic composites. As stated above, the "digestive" method yields a lower ABD than the "slurry" method: obviously, therefore, a significantly lesser amount (by weight) of the alumina spheres is required for a particularly desired volume of the catalytic composite employed. The catalyst requirement for a given process is generally determined on the basis of volumetric throughput, whereas the initial cost of such catalyst is usually based upon a unit weight thereof.

In the "slurry" method, the basic aluminum sulfate filter cake is chilled, or cooled to a temperature below about 120° F., and preferably to a temperature level within the range of about 65° F. to 85° F.; or lower. Urea, in aqueous solution, is commingled therewith in an amount to yield a weight ratio of the alumina equivalent of the aluminum sulfate to the urea not substantially in excess of about 3.5:1. As employed in the present specification and the appended claims, the term, "alumina equivalent," is designed to denote that quantity of alumina ($Al_2O_3$) which would ultimately result if all the aluminum in a particular solution were converted to alumina. The term is employed in regard to the basic aluminum sulfate and the aluminum chloride hydrosol, and is a convenient means of expressing the various quantities and concentrations of materials employed in my method. The decomposition of urea, essential for the ultimately complete neutralization of the basic aluminum sulfate, requires an elevated temperature in excess of about 200° F., although at least partial decomposition is effected at temperatures as low as 120° F. At these temperatures, however, the tendency exists for mixtures of urea and basic aluminum sulfate to set virtually immediately to a solid gelatinous mass containing partially neutralized basic aluminum sulfate in non-homogeneous admixture with aluminum hydroxide. In addtion to its non-homogeneity, the gelatinous mass is inherently difficult to process further in order to produce an alumina hydrosol acceptable for utilization in the formation of spherical alumina particles via the oil-drop method. In accordance with the procedure of my invention, the urea is employed in an amount to yield a weight ratio of alumina equivalent, within the basic aluminum sulfate, to urea of from about 1.5:1 to about 3.5:1, and temperatures not in excess of 120° F. are employed; it is preferred, however, to effect the liquification, or re-slurrying, of the basic aluminum sulfate at lower temperatures, and preferably within the range of about 65° F. to about 85° F.

As hereinbefore stated, hexamethylenetetramine is added, as the last step of the procedure, prior to charging the aluminum-containing hydrosol to the dropping tower. Hexamethylenetetramine serves the function of neutralizing the alumina hydrosol, through its decomposition into ammonia and formaldehyde, as the newly formed spheres are passing through the hot oil within the forming tower. Generally, this relatively expensive reagent must necessarily be employed in great excess over the stoichiometric quantity required to yield sufficient ammonia to effect gellation of the formed hydrosol, and to completely neutralize the same. When insufficient hexamethylenetetramine is employed, the final spherical particles are weakened as a result of the cracks and channels developed during the high-temperature calcination thereof. Excessive quantities of hexamethylenetetramine are required as a result of the formation of formaldehyde, as the decomposition progresses, which inhibits further decomposition with the end result that incomplete gellation and neutralization are encountered. As a result of employing urea, I have found that lesser quantities of the more expensive hexamethylenetetramine are required for complete gellation and neutralization of the aluminum-containing hydrosol. Urea serves to tie up the formaldehyde, as well as to supply additional ammonia for the neutralization of the hydrosol. The use of urea permits forming spherical alumina particles while employing as little as 20% to 30% of the generally required excessive amount of hexamethylenetetramine.

The mixture of finely divided basic aluminum sulfate and urea is then commingled with a previously prepared aluminum chloride hydrosol. The latter may be prepared by any of the well-known methods hereinbefore set forth; however, in accordance with one of the more specific embodiments of the present invention, the aluminum chloride hydrosol has an aluminum to chloride weight ratio not substantially in excess of 1.25. Preferably, the aluminum chloride hydrosol has an aluminum to chloride weight ratio within the range of about 0.95 to about 1.25. In addition, the hydrosol is commingled with the urea-basic aluminum sulfate mixture while the latter is still at a temperature below about 120° F. The aluminum chloride hydrosol is employed in an amount to yield a weight ratio of the alumina equivalent of the basic aluminum sulfate to that of the aluminum chloride hydrosol of at least about 1:1 and preferably within the range of about 1:1 to about 3:2. The "slurry" method results in a spherical alumina particle having an apparent bulk density within the range of about 0.70 to about 0.80, or higher; the high ABD's result from employing aluminum chloride hydrosols having aluminum to chloride weight ratios of the order of 1.25—spheres having an ABD of about 0.70 may be prepared when employing aluminum chloride hydrosols with a weight ratio of about 0.95.

As hereinbefore stated, the method of the present invention may be effected through the use of two different procedures: the second procedure differs from the first only in the sequence of steps above described. In the second procedure, following the formation of the basic aluminum sulfate slurry, and prior to the addition thereto of the aqueous solution of urea, the slurry is commingled with an aluminum chloride hydrosol (having a weight ratio of aluminum to chloride within the range of from about 0.95 to about 1.25) and dissolved therein by digestion at a temperature in excess of 120° F. The resulting clear solution is then cooled, or chilled to a level below 120° F., and the urea added as previously described. This method has the advantage of yielding a clear, totally homogeneous solution, rather than a very finely divided slurry: the procedure is, therefore, preferred over the first described procedure, although the latter will result in alumina spheres which are suitable for use as hereinbefore provided. In addition, the "digestive" method affords control of a more widespread range of apparent bulk density of the final alumina spheres, that of about 0.45 to about 0.75 depending again upon the aluminum to chloride weight ratio of the aluminum chloride hydrosol in which the basic aluminum sulfate slurry is digested.

The following examples are given to further illustrate the method and utility of the present invention: it is not intended to limit the same to the quantities, conditions and/or concentrations employed. The present invention is not intended to be limited beyond the scope and spirit of the appended claims.

*Example I*

50 milliliters of water were placed in a glass beaker, and about 3 milliliters of a 28% by weight solution of aluminum sulfate, having a pH of 1.5, was added thereto. The pH of the resulting solution was adjusted to a level of 6.0 through the addition of a sufficient quantity of an aqueous solution of 28% by weight of ammonium hydroxide, having a pH of 12.8. The aqueous solutions of aluminum sulfate and ammonium hydroxide were then added continuously and simultaneously at such rates as to maintain the pH of the resulting reaction mixture at a level of about 6.0, not permitting the same to vary beyond the limits of 5.5 and 6.5. The addition of the aluminum sulfate and ammonium hydroxide solutions was continued until a total of two gallons of the aluminum sulfate solution had been added. The approximate rates during the addition, and subsequent commingling of the two substances, were 1200 milliliters of aluminum sulfate solution per hour and 400 milliliters of ammonium hydroxide solution per hour.

The resulting basic aluminum sulfate was removed from the accompanying solution through a single washing procedure by filtration; the filter cake was re-slurried to a total weight of about 7000 grams. The slurry was analyzed and found to contain about 6.0% by weight of aluminum and approximately 5.5% by weight of sulfate ions. 1116 grams of this basic aluminum sulfate slurry was subjected to filtration on a Buchner funnel, and a total of 667 grams of basic aluminum sulfate was obtained in the form of a filter cake having a solids content of 19.8% by weight, calculated as $Al_2O_3$. This example illustrates the method of the constantly acidic pH precipitation, and the benefits afforded in producing an acceptable filter cake.

*Example II*

A 455 gram portion of re-slurried basic aluminum sulfate filter cake (approximately 16.7% $Al_2O_3$) was intimately commingled with 250 grams of an aluminum chloride hydrosol containing 12% aluminum and 10.7% chloride. The basic aluminum sulfate was prepared as described in Example I and the aluminum chloride hydrosol was prepared via the method which consists of digesting substantially pure aluminum metal in concentrated hydrochloric acid and subsequent dilution with water to attain the desired aluminum to chloride weight ratio. 350 milliliters of a 30% by weight solution of hexamethylenetetramine was added to the mixture of aluminum sulfate and aluminum chloride hydrosol. Alumina hydrogel spheroids were formed by the oil-drop method previously described, and these hydrogel spheroids were further processed in accordance with conventional aging techniques, namely, a 20-hour oil age at 95° C., a 2-hour aqueous ammonia age at 95° C. and a 12-hour hot water wash at a temperature of 95° C. After drying at a temperature of 200° C., and calcining at a temperature of 650° C., the apparent bulk density of the resulting alumina spheres was determined as 0.750.

*Example III*

202 grams of basic aluminum sulfate slurry was blended with 100 grams of the aluminum chloride hydrosol described in Example II. The mixture was heated at a temperature of about 95° C. for a period of about two hours. During the period of heating, the mixture was permitted to boil down to a concentration of 12% aluminum by weight. It was noted that the basic aluminum sulfate dissolved, resulting thereby in a hydrosol that was virtually water-white. During the process of forming this aluminum-containing hydrosol into hydrogel spheroids, it was noticed that the hydrosol exhibited the tendency to coagulate upon the addition of hexamethylenetetramine. It was then found that a reduction in the quantity of hexamethylenetetramine, to about 50% by weight of the normal requirement, while adding a 25% by weight solution of urea, resulted in a homogeneous fluid mixture which yielded acceptable alumina hydrogel spheroids.

*Example IV*

A 50–50 mixture of basic aluminum sulfate and aluminum chloride hydrosol prepared as in Example III, was commingled with various mixtures of hexamethylenetetramine and urea. Upon formation into hydrogel spheroids which were subsequently dried and calcined, there resulted apparent bulk densities of about 0.680.

Example V

An aqueous solution of aluminum sulfate was prepared by dissolving 5400 grams into 7 liters of water. The resulting solution, containing about 7.5% $Al_2O_3$ equivalent, was simultaneously precipitated with a 28% by weight solution of ammonium hydroxide at a control pH level of 6.0. The precipitated basic aluminum sulfate was filtered on a Buchner funnel, and washed thereon until the filtrate indicated a negative test for sulfate ions. Following the washing and filtering, the filter cake was reslurried to a total of 7000 grams, and a chemical analysis indicated 6.27% by weight aluminum and 5.43% by weight sulfate ions. 882 grams of the basic aluminum sulfate slurry was blended with 330 grams of aluminum chloride hydrosol to yield a hydrosol containing about 10.4% by weight of aluminum. To the resulting mixture was added 260 milliliters of a 30% by weight solution of hexamethylenetetramine and 390 milliliters of an aqueous solution of urea containing 25.4 grams of urea per 100 milliliters. The mixture was formed into hydrogel spheroids via the oil-drop method and thereafter subjected to the aging procedure hereinabove set forth. The hydrogel spheroids were dried at a temperature of 200° C. and calcined at a temperature of 650° C., yielding thereby firm sherical alumina particles having an apparent bulk density of 0.5.

Example VI

A series of experiments were performed utilizing an alumina hydrosol wherein 60% by weight of the total aluminum was furnished by basic aluminum sulfate, and 40% by weight furnished from an aluminum chloride hydrosol. It was found that an apparent bulk density of about 0.56 resulted from a digested mixture containing an aluminum chloride hydrosol having an aluminum to chloride weight ratio of 1.24. Decreasing the ratio to 1.1 resulted in spherical aluminum particles having an apparent bulk density of about 0.53. When the alumina particles were prepared utilizing an aluminum chloride hydrosol having an aluminum to chloride weight ratio of 0.95, the apparent bulk density was 0.500. The effect of lowering the apparent bulk density as the aluminum to chloride weight ratio of the aluminum chloride hydrosol portion of the combined alumina sol is decreased, is a relatively simple method of controlling the apparent bulk density of the final alumina spheres. Further, it is seen that an aluminum chloride hydrosol, having an aluminum to chloride weight ratio of 0.95 to about 1.25, results in spheres having the particularly preferred apparent bulk density of about 0.50 to about 0.60.

The foregoing examples and specification clearly illustrate the several embodiments of the present invention, and the benefits afforded through the utilization thereof.

I claim as my invention:

1. A method for manufacturing spherical alumina particles from aluminum sulfate which comprises simultaneously commingling an aqueous solution of aluminum sulfate with an aqueous solution of ammonium hydroxide at a constantly acidic pH within the range of about 5.5 to about 6.5, thereby forming insoluble basic aluminum sulfate, separating said basic aluminum sulfate from the liquid and then commingling the same with an aluminum chloride hydrosol, having an aluminum to chloride weight ratio of from about 0.95 to about 1.25, in an amount to yield at least a 1:1 weight ratio of the alumina equivalent of said basic aluminum sulfate to that of said aluminum chloride hydrosol, heating the resulting mixture of basic aluminum sulfate and aluminum chloride hydrosol at a temperature in excess of 120° F. until the basic aluminum sulfate is dissolved in said aluminum chloride hydrosol, decreasing the temperature of the resulting clear solution to below 120° F. and adding urea thereto in an amount to yield a weight ratio of the alumina equivalent of said basic aluminum sulfate to urea of from about 1.5:1 to about 3.5:1, thereafter adding hexamethylenetetramine and passing the mixture thus formed into an oil bath in the form of droplets, retaining the droplets in said oil until they set to hydrogel spheroids, and thereafter drying and calcining said hydrogel spheroids, obtaining thereby firm spherical alumina particles.

2. A method for manufacturing spherical alumina particles from aluminum sulfate which comprises simultaneously commingling an aqueous solution of aluminum sulfate with an aqueous solution of ammonium hydroxide at a constantly acidic pH within the range of about 5.5 to about 6.5, thereby forming insoluble basic aluminum sulfate, separating said basic aluminum sulfate from the liquid and then liquefying the same with urea at a temperature below 120° F. and in an amount to yield a weight ratio of the alumina equivalent of the basic aluminum sulfate to urea of from about 1.5:1 to about 3.5:1, commingling the resultant sulfate-urea solution, while at a temperature below about 120° F. with an aluminum chloride hydrosol having an aluminum to chloride weight ratio of from about 0.95 to about 1.25, in an amount to yield at least a 1:1 weight ratio of the alumina equivalent of said basic aluminum sulfate to that of said aluminum chloride hydrosol, adding hexamethylenetetramine to the mixture thus formed and passing the last-mentioned mixture into an oil bath in the form of droplets, retaining the droplets in said oil until they set to hydrogel spheroids, thereafter drying and calcining said hydrogel spheroids and recovering firm spherical alumina particles.

3. The method of claim 2 further characterized in that the basic aluminum sulfate, containing urea, is commingled with said aluminum chloride hydrosol to yield a weight ratio of the alumina equivalent of said basic aluminum sulfate to that of said aluminum chloride hydrosol within the range of about 1:1 to about 3:2.

References Cited in the file of this patent
UNITED STATES PATENTS

| | | |
|---|---|---|
| 1,337,192 | Buchner | Apr. 20, 1920 |
| 2,666,749 | Hoekstra | Jan. 19, 1954 |
| 2,798,050 | Gladrow et al. | July 2, 1957 |
| 2,865,866 | Hoekstra | Dec. 23, 1958 |
| 2,898,306 | Cramer et al. | Aug. 4, 1959 |
| 2,913,400 | Burton et al. | Nov. 17, 1959 |